(12) United States Patent
Solomons et al.

(10) Patent No.: US 6,814,060 B1
(45) Date of Patent: Nov. 9, 2004

(54) ENGINE EMISSION CONTROL SYSTEM AND METHOD

(75) Inventors: Keith E. Solomons, Chicago, IL (US); Budhadeb Mahakul, Naperville, IL (US); Rafiqul Islam, Hinsdale, IL (US); Chih L. Liu, Naperville, IL (US); Bradley S. Silvers, Yorkville, IL (US); Le Blanc Martin, South Holland, IL (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/673,032

(22) Filed: Sep. 26, 2003

(51) Int. Cl.[7] .............................................. F02M 59/20
(52) U.S. Cl. ...................................... 123/501; 123/357
(58) Field of Search ................................. 123/500, 501, 123/357, 494

(56) References Cited

U.S. PATENT DOCUMENTS

| | | | | |
|---|---|---|---|---|
| 4,423,713 A | * | 1/1984 | Sami et al. ................. | 123/357 |
| 4,479,473 A | * | 10/1984 | Wade .......................... | 123/369 |
| 4,596,221 A | * | 6/1986 | Ament et al. ................ | 123/501 |
| 4,807,572 A | * | 2/1989 | Schlunke ................... | 123/73 C |
| 5,146,900 A | * | 9/1992 | Sekiya ........................ | 123/501 |
| 5,183,013 A | * | 2/1993 | Ito et al. .................... | 123/48 R |
| 2003/0221676 A1 | * | 12/2003 | Glenn et al. ................ | 123/501 |

* cited by examiner

*Primary Examiner*—Weilun Lo
(74) *Attorney, Agent, or Firm*—Cary W. Brooks

(57) ABSTRACT

A diesel engine emission control system which optimizes fuel injection timing over a range of air temperatures, air pressures, and engine air flow rates. The emission control system includes a control module interfacing with a fuel injection timing module which in turn interfaces with an engine fuel injection system having fuel injectors. The control module receives data from an air temperature sensor, an air pressure sensor, and an engine boost pressure sensor. The control module determines air density and the air flow rate through the engine to determine optimal fuel injection timing. The injection timing information is relayed to the injection timing module which alters the timing of the fuel injectors to operate the engine at a maximum efficiency possible within applicable emission regulation limits.

12 Claims, 5 Drawing Sheets

ENGINE EMISSION CONTROL SYSTEM AND METHOD

TECHNICAL FIELD

This invention relates to diesel engine emission controls and, more specifically, to methods of optimizing fuel injection timing for NOx emission control in a diesel engine.

BACKGROUND OF THE INVENTION

The Environmental Protection Agency (EPA) requires diesel locomotives to comply with emission regulations over a wide range of ambient temperatures and pressures. More specifically, locomotive emissions are regulated in ambient temperatures between 45° F. and 105° F. and ambient pressures between 26–31 inches of mercury.

In order to meet emission regulations set forth by the EPA, engines used in diesel locomotives are set to operate with fixed fuel injection timing, which is retarded adequately to limit the formation of nitrogen oxides (NOx) for compliance with EPA emission regulations at all applicable operating temperatures and pressures. However, a drawback to retarded injection timing is that it can increase smoke, particulate emissions and fuel consumption. In addition, the amount of injection retard required to reduce NOx levels under one set of operating conditions may not be required under other conditions.

SUMMARY OF THE INVENTION

The present invention provides an emission control system for setting optimal fuel injection timing to meet EPA emission regulations and maximize engine fuel efficiency over a wide range of operating temperatures and pressures. In an exemplary embodiment, the emission control system determines optimal injection timing by determining air density and air flow within an engine and comparing the air density and air flow values to a fuel injection timing map calibrated to comply with emission regulations.

The emission control system includes a control module connected to an air pressure sensor, an air temperature sensor, an engine boost pressure sensor, and an engine fuel injection timing module which is connected to at least one fuel injector or injection pump in a fuel injection system.

The air pressure sensor determines the inlet air pressure and relays the information to the control module. The air temperature sensor determines the inlet air temperature and relays the information to the control module. The boost pressure sensor detects engine boost pressure and relays the boost pressure information to the control module. The information relayed to the control module is used to calculate inlet or ambient air density and the air flow rate through the engine. The control module uses the air density and air flow rate, information to determine an optimal fuel injection timing, or most advanced timing possible, while still complying with emission regulations. The fuel injection timing information is then relayed to the fuel injection timing module to alter the timing of the fuel injector(s). The emission controller operates to recalculate the optimal fuel injection timing and alter injector timing accordingly to operate the engine as efficiently as possible within the emission limits.

These and other features and advantages of the invention will be more fully understood from the following description of certain specific embodiments of the invention taken together with the accompanying drawings.

DESCRIPTION OF THE PREFERRED EMBODIMENT

Figure 1:
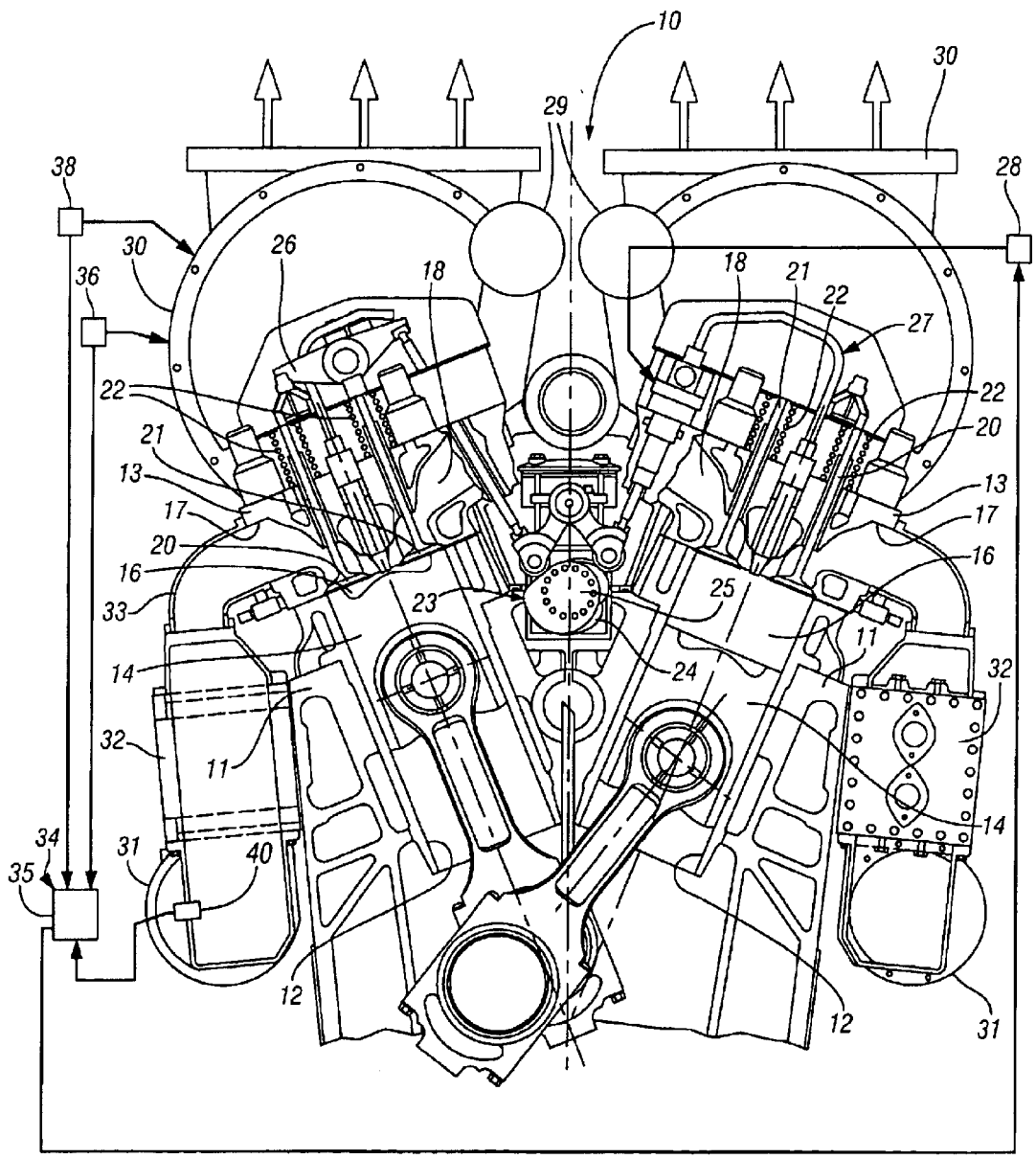
FIG. 1 is a transverse cross-sectional view of a turbocharged four stroke cycle diesel engine having an emission control system according to the invention.

Referring first to FIG. 1 of the drawings in detail, numeral 10 generally indicates, as an example, a four stroke cycle turbocharged and aftercooled diesel engine intended primarily for rail locomotive applications. The engine 10 has two cylinder banks 11, each having a plurality of cylinders 12 closed by cylinder heads 13. Pistons 14, reciprocable within the cylinders, define variable volume combustion chambers 16 between the pistons and cylinder heads.

The cylinder heads 13 contain intake and exhaust ports 17, 18 that communicate with the combustion chambers and are controlled by intake and exhaust valves 20, 21, respectively, mounted in the cylinder heads and biased by the valve springs 22. The valves are mechanically actuated by intake and exhaust cams 23, 24 of a camshaft 25 driving an associated valve actuating mechanism including push rods and rocker arms, such as intake rocker arm 26. The fuel injection system 27 is mechanically actuated and electronically controlled by an injection timing module 28. Exhaust products are discharged through the exhaust ports 18 and exhaust manifolds 29 to turbochargers 30. These, in turn, draw inlet air through air intakes, not shown, and supply inlet charge air through intake headers 31, aftercoolers 32, intake manifolds 33 and intake ports 17 to the engine cylinders at varying temperatures.

The engine cycle conventionally includes intake, compression, expansion and exhaust strokes of the pistons. Intake air charges drawn into the combustion chambers 16 on the intake strokes are compressed with the valves closed. Upon compression, fuel is injected and ignited by the hot compressed gases present in the combustion chambers 16. As the mixture of fuel and air burns, increased combustion chamber pressures act on the pistons during their expansion strokes to produce power. The combustion products exhausted through the exhaust ports 18 provide energy, at higher loads, for the turbocharger 30 to boost the pressure of the intake air charges. The combination of high combustion temperatures and free oxygen in the combustion chambers 16 causes the formation of nitrogen oxides (NOx) which the invention is desired to control.

Figure 2:
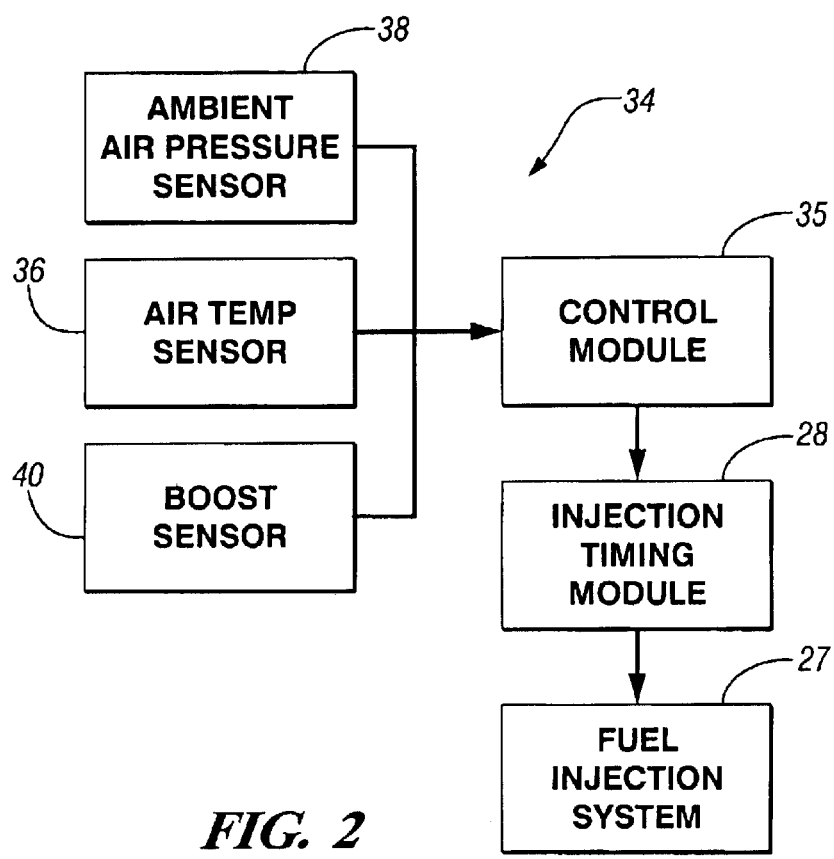
FIG. 2 is a schematic diagram of the engine emission control system according to one embodiment of the present invention.

In accordance with the invention, fuel injection timing is controlled by operation of an emission control system 34, as shown in FIG. 2. The system 34 includes a control module 35 interfacing with the fuel injection timing module 28 which in turn interfaces with engine fuel injection system 27 to control fuel injector timing. The control module 35 connects with an air temperature sensor 36, an air pressure sensor 38, and an engine boost pressure sensor 40.

The air temperature and pressure sensors 36, 38 may be mounted at any suitable location on the engine, such as the airbox of a two-stroke cycle engine, not shown, or in an air intake, an intake manifold 33, an intake port 17, or any other convenient location before intake valves 20 of the four-stroke cycle engine described. As the sensors 36, 38 detect the air temperature and pressure, they relay the information to the control module 34.

Since internal engine temperatures and pressures vary, it is preferred to take the readings near the inlet ports 17 of the engine 10 to determine the air density immediately before the air enters the combustion chambers 16. However, it should be understood that air density may also be calculated by taking air temperature and pressure readings upstream from the cylinders in the air intake, before the turbocharger inlet.

Tests were performed to determine the effects of a wide range of ambient temperatures and pressures on NOx emissions. From these tests it was determined that NOx emissions increase linearly as air density or boost pressure increases. Based upon this information, a new method has been developed that utilizes varying boost pressure and air density conditions to determine desired injection timing settings. The relationships are further illustrated in FIGS. 3 and 4.

Figure 3:
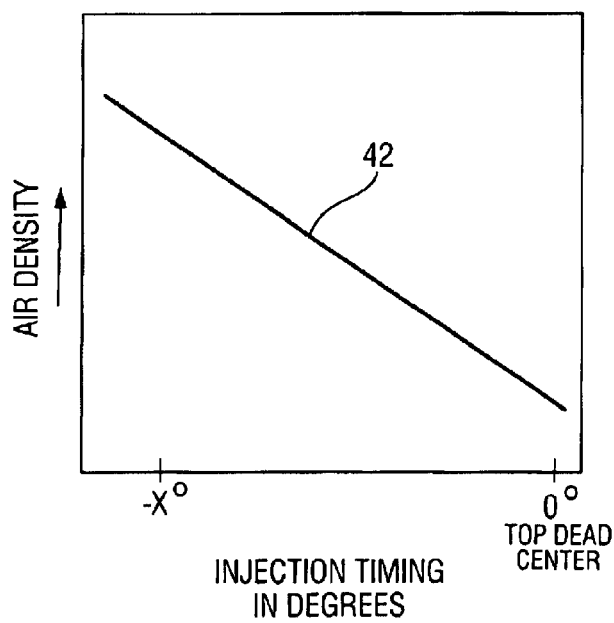
FIG. 3 is a graph showing a linear relationship between air density and fuel injection timing.
Figure 4:
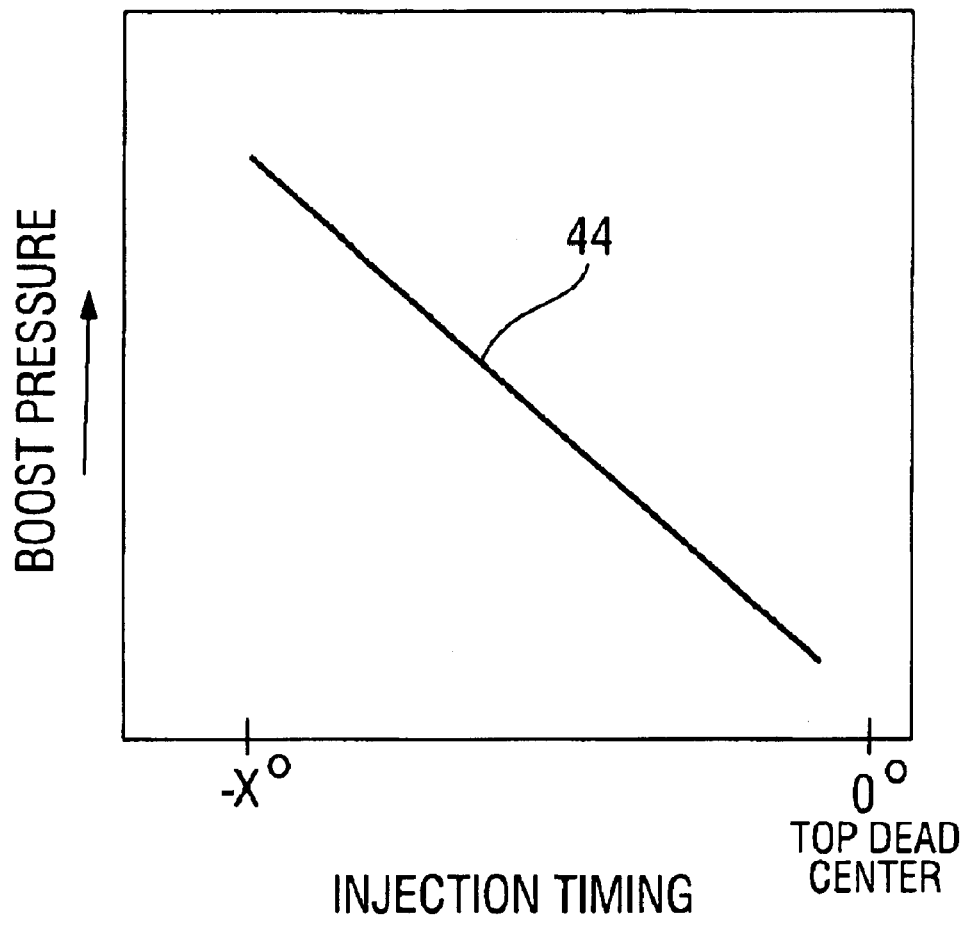
FIG. 4 is a graph showing a linear relationship between fuel injection timing and boost pressure.

FIG. 3, is a diagram in which line 42 exemplifies the relationship between air density and fuel injection timing at a constant boost pressure. Accordingly, as air density increases, injection timing should be retarded proportionally to operate the engine within the emission limits. FIG. 4, is a diagram in which line 44 exemplifies the relationship between boost pressure and fuel injection timing at a constant air density. Accordingly, as boost pressure increases, injection timing should be retarded proportionally to operate the engine within the emission limits. When the emission control system is controlled according to the relationships exemplified in the diagrams illustrated in FIGS. 3 and 4, the engine is allowed to operate, within the emission requirements, at maximum fuel efficiency over a wide range of operating conditions.

Using the above information, the control module 35 functions to determine the density of the air within the engine by comparing the temperature and the pressure of the air at the sensors 36, 38. The control module 35 may calculate air density by comparing the air temperature and air pressure using a linear calculation or a lookup table as known in the art. In addition, the control module 34 also converts boost pressure information received from the engine boost pressure sensor 40 into an engine air flow rate based upon engine test results set forth in a formula or an air flow lookup table as known in the art.

Figure 5:
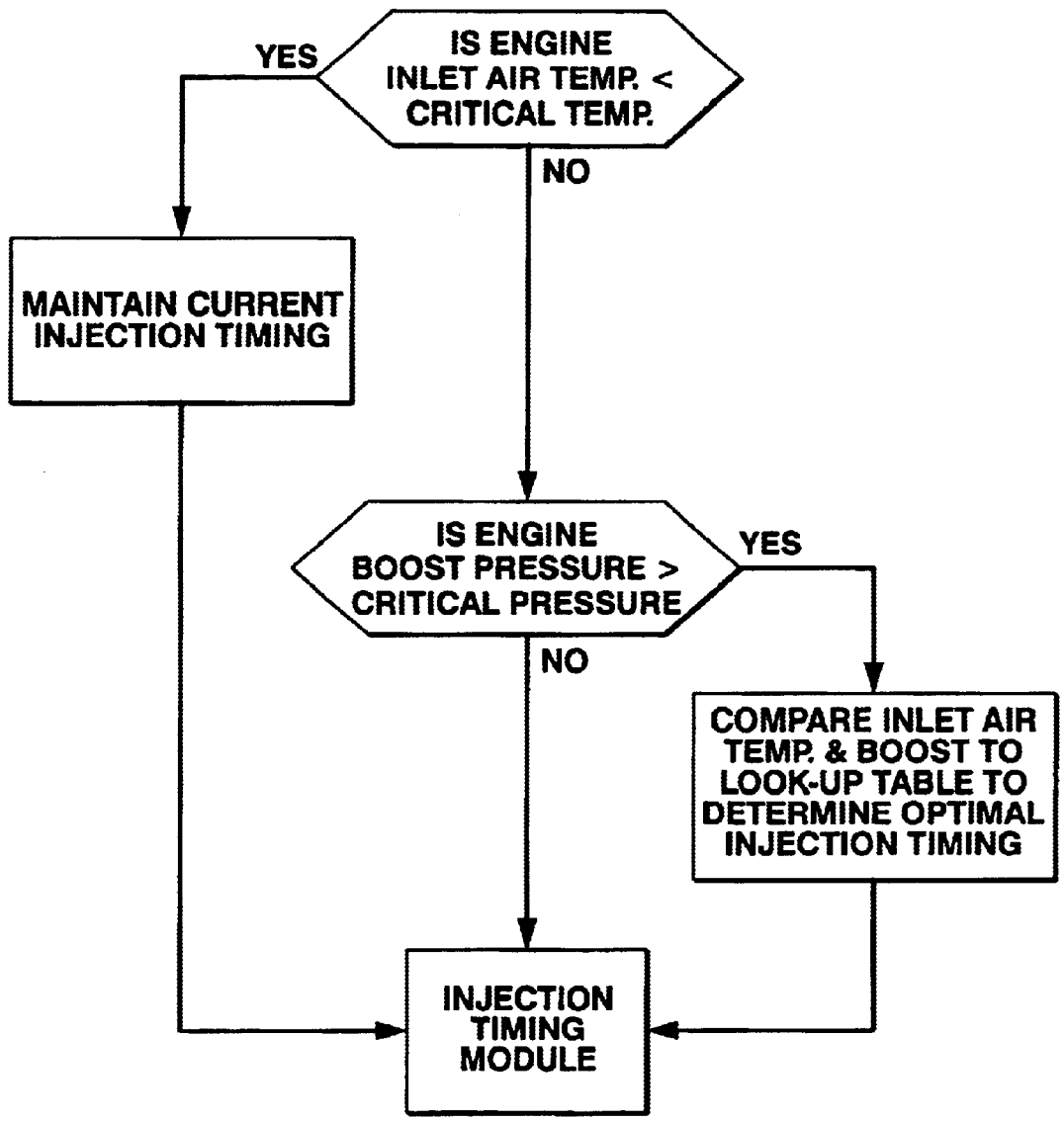
FIG. 5 is a schematic diagram illustrating an exemplary method of determining optimal fuel injection timing in the engine of FIG. 1.

FIG. 5 is a diagram showing an alternative method of selecting an optimal fuel injection timing. First, the control module compares ambient air temperature to a critical temperature such as the minimum regulated air temperature, to determine if emission regulations apply to the engine. If the ambient temperature is below the critical temperature, the control module maintains previous injection timing otherwise, the module continues the process to select a new optimal injection timing. After determining inlet air temperature, the control module considers boost pressure. If the boost pressure is above a critical pressure, the control module compares boost pressure and inlet temperature to a lookup table to determine the optimal injection timing under the given boost pressure and inlet air temperature. The injection timing information is then sent to the fuel injection timing module 28, which alters the timing of the fuel injectors in the fuel injection system 27 to operate the engine at the prescribed optimal injection timing.

In operation, the emission control system 32 actively monitors the temperature and pressure of the air within the engine as well as the engine boost pressure. As the air pressure, air temperature, or boost pressure change, the emission control system 32 recalculates the air density and the air flow rate to determine the best fuel injection timing to operate the engine at the maximum fuel efficiency possible within the emission regulations.

Referring now to the exemplary engine of FIG. 1, air is drawn into the engine through the air intake, not shown, to the turbochargers 30, which supply pressurized air to the intake headers 31 and intake manifolds 33. The pressurized air in the intake manifolds 33 flows through the aftercoolers 32 which cool the air and carry the air to the intake ports 17 and ultimately to the combustion chambers 16. As the intake air flows through the air intake, the sensors detect the intake air temperature and ambient pressure and relay the information to the control module 35. In addition, boost pressure information from the engine boost pressure sensor 40 is relayed to the control module 35.

As the control module 35 receives information from the sensors 38, 38 and 40, the control module calculates the air density and the air flow rate through the engine. Once the air density and air flow rate are established, the control module 35 determines the optimal fuel injection timing to operate the engine 10 at the most advanced injection timing possible while keeping NOx production below emission limits. The fuel injection timing information is relayed from the control module 35 to the fuel injection timing module 28 which alters the timing of the fuel injection system 27 to operate the engine according to the timing set by the control module. As air density or air flow rates change, the control module 35 recalculates the best fuel injection timing under the new circumstances and sends the new timing information to the fuel injection control module 28 to further alter the timing of the injection system 27.

The above-described method of emission control may further be varied by positioning the air temperature and pressure sensors in an engine's intake manifolds after the turbochargers to detect pressurized air temperature and pressure. When the pressure sensor is located after the turbochargers, it may be used as both an air pressure sensor for calculating air density and boost pressure sensor for determining the air flow rate through the engine. In this situation, the emission control receives air pressure information from the air pressure sensor and uses the information to calculate air density as well as convert the air pressure information into boost pressure to determine the air flow rate. In such an instance, the control module program may be altered to correct for the differences between pressurized intake manifold air temperatures and pressures and ambient intake air temperatures and pressures.

The above-described method of emission control may be varied by positioning the air temperature and pressure sensors outside the engine to detect ambient air temperature and pressure. In such an instance, the control module program may be altered to correct for differences between ambient air temperatures and pressures and intake port air temperatures and pressures.

The emission control method may be extended by comparing engine airflow to determine an air/fuel ratio. The control module then operates to compare the air/fuel ratio to engine load and speed and adjusts the optimal injection timing setting accordingly.

Figure 6:
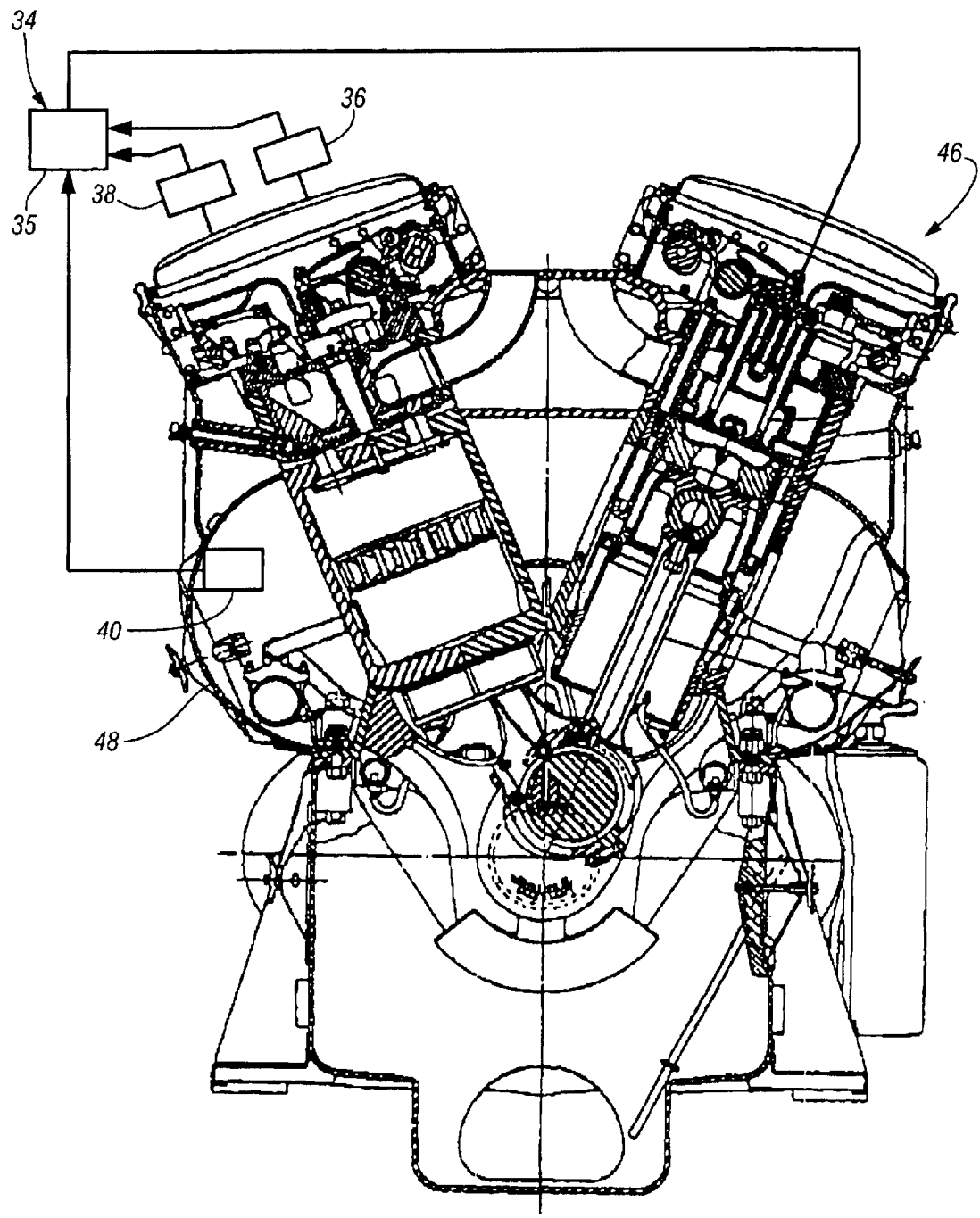
FIG. 6 is a transverse cross-sectional view of a turbocharged two stroke cycle diesel engine having an emission control system according to the invention.

The emission control may also be used in a two stroke cycle engine 46 as shown in FIG. 6. In the two stroke cycle engine 46, the boost pressure sensor 40 may be installed in an air box 48, as shown in the figure, or at any suitable location between the turbocharger, not shown, and the air box. The air pressure sensor 38 and the air temperature sensor 36 may be installed in an air intake, not shown, or at any other suitable location before the turbocharger to measure ambient air pressure and temperature. In an alternative embodiment, the air pressure and temperature sensors 38, 36 may be located outside the engine 46, as shown in FIG. 6, to measure ambient air pressure and temperature. In yet another embodiment, the temperature and pressure sensors 36, 38 may be installed in the air box 48 for detecting the temperature and pressure of the pressurized air within the air box before it enters cylinders 50. In this instance, the conventional boost pressure sensor 40 may be removed and the air pressure sensor 38 may be used as both an air pressure sensor and a boost pressure sensor for determining the air flow rate through the engine. Based upon engine boost pressure, ambient air pressure, and ambient air temperature, the emission control system 34 responds to alter the engine fuel injection timing to operate the engine at the most advanced fuel injection timing possible within the emission regulations.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An emission control system for setting fuel injection timing in a diesel engine, the system comprising:

a control module connected to an air pressure sensor, an air temperature sensor, an engine boost pressure sensor, and an engine fuel injection timing module operative to control fuel injector timing of a fuel injection system;

the control module operating to calculate air density from the air temperature and air pressure data received from the air pressure and air temperature sensors;

the control module operating to determine air flow through the engine using engine boost pressure data received from the boost pressure sensor;

the control module operating to determine optimal fuel injection timing by comparing the air flow rate and air density to a fuel injection timing map; and the control module operating to send a fuel injection timing signal to the fuel injection timing module to alter fuel injection timing.

2. A system as in claim 1 wherein the air temperature sensor detects air temperature within an engine air intake.

3. A system as in claim 1 wherein the air pressure sensor detects air temperature within an engine air intake.

4. A system as in claim 1 wherein the air pressure sensor detects engine boost pressure and air pressure within the intake manifold.

5. A system as in claim 1 wherein the air pressure and temperature sensors are located outside the engine to detect ambient air pressure and temperature.

6. A method of optimizing injection timing comprising the steps of:

providing a control module receiving environmental and operational data including air pressure, air temperature, and engine boost pressure, the control module interfacing with a fuel injection timing module operative to control fuel injector timing of a fuel injection system;

calculating air density from the received air pressure and air temperature data;

determining the air flow rate through the engine based upon the engine boost pressure data contained in a lookup table;

determining optimal fuel injection timing by comparing the air density and the air flow rate to a fuel injection timing map and sending the fuel injection timing to the fuel injection control module; and altering the timing of the fuel injectors with the injection timing module to operate the engine at maximum efficiency under applicable emission regulations.

7. A method as in claim 6 wherein the optimal fuel injection timing is the most advanced fuel injection timing possible under the emission guidelines.

8. A method as in claim 6 wherein the air pressure is measured within an air intake.

9. A method as in claim 6 wherein the air pressure sensor measures air pressure and boost pressure within an intake manifold.

10. A method as in claim 6 including further altering fuel injection timing as a function of engine load, speed and air/fuel ratio.

11. A method as in claim 6 wherein the air pressure and temperature sensors mounted outside the engine to measure ambient air pressure and temperature.

12. A method as in claim 6 wherein the air temperature is measured within an air intake.

* * * * *